US010202534B2

(12) United States Patent
Al-Bagoury et al.

(10) Patent No.: US 10,202,534 B2
(45) Date of Patent: Feb. 12, 2019

(54) VISCOSIFIER FOR OIL WELL FLUIDS

(71) Applicant: Elkem AS, Oslo (NO)

(72) Inventors: Mohamed Al-Bagoury, Kristiansand (NO); Arianeh Aamodt, Kristiansand (NO)

(73) Assignee: ELKEM ASA, Oslo (NO)

( * ) Notice: Subject to any disclaimer, the term of this patent is extended or adjusted under 35 U.S.C. 154(b) by 0 days.

(21) Appl. No.: 14/774,415

(22) PCT Filed: Mar. 18, 2014

(86) PCT No.: PCT/NO2014/050039
§ 371 (c)(1),
(2) Date: Sep. 10, 2015

(87) PCT Pub. No.: WO2014/148917
PCT Pub. Date: Sep. 25, 2014

(65) Prior Publication Data
US 2016/0032168 A1    Feb. 4, 2016

(30) Foreign Application Priority Data
Mar. 20, 2013 (NO) .................. 20130411

(51) Int. Cl.
C09K 8/32       (2006.01)
C09K 8/588      (2006.01)
C09K 8/44       (2006.01)
C09K 8/64       (2006.01)
C09K 8/40       (2006.01)
(Continued)

(52) U.S. Cl.
CPC ............. *C09K 8/32* (2013.01); *C04B 28/02* (2013.01); *C08B 15/02* (2013.01); *C08L 1/04* (2013.01); *C09K 8/035* (2013.01); *C09K 8/40* (2013.01); *C09K 8/44* (2013.01); *C09K 8/487* (2013.01); *C09K 8/502* (2013.01); *C09K 8/512* (2013.01); *C09K 8/588* (2013.01); *C09K 8/64* (2013.01); *C09K 8/685* (2013.01); *C09K 8/82* (2013.01); *C09K 8/887* (2013.01); *C09K 8/90* (2013.01); *D21H 11/18* (2013.01);
(Continued)

(58) Field of Classification Search
None
See application file for complete search history.

(56) References Cited

U.S. PATENT DOCUMENTS 4,452,722 A   6/1984 Turbak et al.
4,767,848 A   8/1988 Makoui et al.
(Continued)

FOREIGN PATENT DOCUMENTS

CN   1227589 A    9/1999
CN   102803431 A  11/2012
(Continued)

OTHER PUBLICATIONS

Extended European Search Report dated Nov. 18, 2016 for corresponding European Application No. 14768147.2-1354.
(Continued)

*Primary Examiner* — Jeffrey D Washville
(74) *Attorney, Agent, or Firm* — Lucas & Mercanti, LLP

(57) ABSTRACT

The present invention comprises a viscosifier for oil well fluids, said viscosifier comprising a cross-linked micro- or nano-fibrillated cellulose (MFC).

21 Claims, 7 Drawing Sheets

(51) Int. Cl.
*C08B 15/02* (2006.01)
*C09K 8/035* (2006.01)
*D21H 11/18* (2006.01)
*C09K 8/68* (2006.01)
*C09K 8/88* (2006.01)
*C08L 1/04* (2006.01)
*C09K 8/487* (2006.01)
*C09K 8/502* (2006.01)
*C09K 8/512* (2006.01)
*C09K 8/82* (2006.01)
*C09K 8/90* (2006.01)
*C04B 28/02* (2006.01)
*C04B 103/00* (2006.01)

(52) U.S. Cl.
CPC .. *C04B 2103/0062* (2013.01); *C09K 2208/08* (2013.01); *C09K 2208/10* (2013.01)

(56) References Cited

U.S. PATENT DOCUMENTS

| | | | |
|---|---|---|---|
| 5,009,797 | A | 4/1991 | Penny et al. |
| 5,104,411 | A | 4/1992 | Makoui et al. |
| 5,122,549 | A | 6/1992 | Holtmyer et al. |
| 5,350,528 | A | 9/1994 | Westland et al. |
| 5,362,713 | A | 11/1994 | Westland et al. |
| 6,348,436 | B1 | 2/2002 | Langlois et al. |
| 6,630,054 | B1 | 10/2003 | Graef et al. |
| 2010/0294980 | A1* | 11/2010 | Hartmann ........ D01F 1/08 252/67 |
| 2013/0035263 | A1 | 2/2013 | Laukkanen et al. |
| 2013/0274149 | A1* | 10/2013 | Lafitte ........ C09K 8/905 507/112 |

FOREIGN PATENT DOCUMENTS

| | | |
|---|---|---|
| FR | 2753995 A1 | 4/1998 |
| GB | 2110698 A | 6/1983 |
| WO | 9640599 A1 | 12/1996 |
| WO | 2011089323 A1 | 7/2011 |
| WO | 2013154926 A1 | 10/2013 |

OTHER PUBLICATIONS

Andreas B. Fall, et al; A physical cross-linking process of cellulose nanofibril gels with . . . ; Soft Matter; 2013; vol. 9; pp. 1852-1863.
International Search Report dated Jun. 11, 2014 for PCT/NO2014/050039 and English translation.
Chinese Office Action and Search Report dated May 12, 2017 for corresponding Chinese Patent Application No. 201480017257.6
C. Fandi, et al; Chemical Industry Press; Fine Chemical Products and Technology; 1997; pp. 326-335.
X. Dongsheng, et al; Development in Applications of Cellulose Derivatives; Plastic Industry, No. 5; 1985; pp. 44-46.
J. Zehui, et al; A review of preparation and properties of microfibrillated cellulose originated from plants; World Forestry Research; vol. 25; No. 2; 2012; pp. 46-50.

* cited by examiner

VISCOSIFIER FOR OIL WELL FLUIDS

CROSS REFERENCE TO RELATED APPLICATION

This Application is a 371 of PCT/NO2014/050039 filed on Mar. 18, 2014 which, in turn, claimed the priority of Norwegian Patent Application No. 20130411 filed on Mar. 20, 2013, both applications are incorporated herein by reference.

TECHNICAL FIELD

The present invention is directed towards a viscosifier for oil well fluids, such as fracturing fluids, drilling fluids, water shut-off fluids, spacer fluids, enhanced oil recovery (EOR) fluids and oil well cementing slurries.

BACKGROUND ART

Cellulose is the main component of higher plant cell walls and one of the most abundant organic compounds on earth. Wood contains approximately 50% cellulose, 30% hemicellulose, and 20% lignin. In the pulping process cellulose is separated from the lignin and hemicellulose in a fibrous form that is purified, dried, and shipped in large rolls. Cellulose has been used for thousands of years but its chemistry like all other biopolymers was discovered and explored with the beginning of the last century. Today extracted and purified cellulose and its derivatives are widely used in several different industrial applications such as textile, paper, paints and coatings, foodstuff, pharmaceuticals and the oil industry.

In the last three decades, defibrillation of cellulose fiber into micro- or nano-fibers with a diameter of less than 1 μm using high shear methods such as high pressure homogenization and other methods has attracted a lot of interest. These fibers are known as MicroFibrillar Cellulose (MFC). Cellulose defibrillation can be performed by a variety of methods as known from the literature. For example it could be performed by applying pure mechanical shearing of any cellulosic raw materials such as bleached & unbleached pulps, vegetables and fruits, wheat and rice straw, hemp and flax, bamboo, beet and sugar cane or ramie and cotton. It is known that chemical or enzymatic treatment of the cellulose raw material prior to the mechanical treatment greatly reduces the energy consumption during the defibrillation process.

A method for enzyme-assisted preparation of MFC nanofibers was presented by Henriksson ("An environmentally friendly method for enzyme-assisted preparation of microfibrillated cellulose (MFC) nanofibers", Henriksson et al, European polymer journal (2007), 43: 3434-3441). In 2006 Saito[2] et al reported on the use of TEMPO-Catalyzed Oxidation of Native Cellulose to produce Microfibrils ("Homogeneous Suspensions of Individualized Microfibrils from TEMPO-*Catalyzed Oxidation of Native Cellulose*", Saito, Biomacromolecules (2006), 1687-1691).

In the TEMPO (2,2,6,6-tetramethylpiperidine-1-oxyl) process a free radical is used to oxidize the primary hydroxyl group in position 6 in the cellulose structure and convert it into carboxyl group that provide repulsive forces between the fibril's. In this process the bonding between the fibrils (such as van der Waals' forces and hydrogen bonding) are disrupted and weakened and this promotes the defibrillation process. The separated primary microfiber has a diameter in range of 5-100 nm and a length that can be varied within the range of 1-100 μm. The diameter of the fibril's can be controlled by using the desired energy input as well by adjusting the treatment condition prior the defibrillation however the length of the fiber is more difficult to control. The size of the defibrillated cellulose fiber depends on the treatment condition.

Another chemical treatment prior to the defibrillation can be the carboxymethylation of cellulose fiber to produce carboxymethylated MFC (CM-MFC) ("The build-up of polyelectrolyte multilayers of microfibrillated cellulose and cationic polyelectrolytes", L. Wågberg et al., Langmuir (2008) 24(3), 784-795,).

Both carboxymethylation and TEMPO treatment introduce anionic changes on the surface of the fibrils additional to the hydroxyl groups that already exist on the cellulose fibrils.

The MFC can be cationically charged if any cationic additives such as cationic surfactants or polymer or inorganic salts are added during the defibrillation process.

Such microfine fibrils with a high aspect ratio have extraordinary rheological and mechanical properties and a lot of research is being conducted to develop applications for such materials.

Bacterial MicroFibrillar Cellulose is produced by various species of *Acetobacter* organisms. The synthesis of bacterially produced cellulose (BPC) can be described as bottom-up synthesis where organisms build new polymeric materials (cellulose fibers) from monomeric spices (glucose units). BPC has, to a certain degree, a similar morphology to the defibrillated cellulose fiber (MFC) discussed above in terms of fiber morphology and size but it differs in the purity and the crystallinity. BPC has attracted a lot of attention in the last two decades due to its remarkable properties that can be used in many applications such as biomedical applications, papermaking, nanocomposites, electronic and acoustic devices, and foodstuffs. However, BPC is not commercially available in large quantities at a reasonable price due to the production complexity, but it has been used in small quantities in some applications. U.S. Pat. No. 5,350,528 discloses the use of BPC within a fracturing fluid composed of bacterial cellulose and a crosslinking agent.

To enhance the productivity of oil and gas wells, stimulation methods such as hydraulic fracturing or acidizing are well-known practice. Hydraulic fracturing fluids comprise mainly water as the fluidic phase, a proppant such as sand or ceramic materials with a defined size and strength to keep the fracture open, a viscosifier to carry and place the proppant into the formation and other chemicals that provide corrosion inhibition, fluid loss control, shale stabilization, etc. The commonly used viscosifiers in fracturing fluids are guar gum and its chemically modified forms such as hydroxypropyl guar (HPG), viscoelastic surfactant, and cellulose derivatives.

Normally guar gum, and its derivatives used in stimulation (hydraulic fracturing) fluids are crosslinked in order to reduce the amount of polymer that is pumped into the formation to minimize the potential of the formation damage due to the blockage of the pore throats by the polymers. It has also been found that crosslinking improves the thermal stability of polymers.

Crosslinking in this context is a reaction involving sites or groups on existing macromolecules or an interaction between existing macromolecules that results in the formation of a small region in a macromolecule from which at least four chains emanate. There are two main mechanisms of crosslinking by means of;

1) Physical crosslinking using ionic or electrostatic interaction. This is used to associate or crosslink the macromolecules. Hydrophobic interaction is also used to associate or crosslink macromolecules in aqueous solution to increase the rheology. Metal cations such as boric acid, or salts of aluminum, titanium or zirconium, or any organic positively charged molecules are used to create an interaction between the biopolymer chains. Such a crosslink is typically weak in nature and may be desirable in some applications where it is necessary for such bonds to be easy to break.
2) Chemical crosslinking where a covalent bond is created between the polymer chains. Polymerization reactions such as free radical or condensation polymerizations are used to chemically crosslink macromolecules such as biopolymers. Also difunctional molecules such as difunctional aldehydes (e.g. glutaraldehyde), or dichloroacetic acid that are able to react with the macromolecules are also used as crosslinking agent. Such crosslinking is hard to break and need chemical treatment to break them like the use of free radicals such as peroxide salts or hypochlorite, chlorate or bromate salts. Such crosslink may be desired in some oil well application such as water shut-off or enhanced oil recovery. Examples of such chemical crosslinkers for cellulose are formaldehyde and difunctional aldehydes (for example glutaraldehyde, dichloroacetic acid, polyepoxides, and urea). Some other crosslinking agents used for starch polymer that can be used with MFC are; sodium trimetaphosphate, sodium tripolyphosphate, epichlorophydrin, phosphoryl chloride, glyoxal, and ammonium zirconium (IV) carbonate.

In recent years a lot of effort has been devoted to develop an alternative viscosifier for guar gum because: there is a shortage in guar supply as the stimulation activity is rapidly growing; guar has a certain temperature limitations; and guar leave residues in the formation even after chemical or enzymatic treatments that are used in order to remove guar gum.

There is therefore a need for an alternative viscosifier which does not suffer from the disadvantages of guar.

According to the present invention there is provided a viscosifier for oil well fluids, said viscosifier comprising a cross-linked micro- or nano-fibrillated cellulose (MFC).

The MFC may be selected from modified MFC such as TEMPO mediated MFC, Carboxymethylated MFC and cationic MFC, Enzymatic assisted MFC, and mechanically produced MFC.

According to an embodiment the cross-linking is physical cross-linking and may be formed by a metal cation or metal complex. The metal cation or metal complex may optionally be selected from the groups consisting of aluminum sulfate ($Al_2(SO_4)_3$), aluminum chloride ($AlCl_3$), zirconium chloride ($ZrCl_4$), chitosan, hyberbranched polymers such as polyesteramide such as Hybrane® 113, polyethyleneimine (PEI), boric acid, borax and borate salts, boron minerals (such as Ulexite ($NaCaB_5O_6(OH)_6.5(H_2O)$) and Colemanite ($CaB_3O_4(OH)_3.H_2O$)), organo-borate complexes (such as 4,4'-biphenyldiboronic acid), organometallic compounds containing Zr, Ti or Hf ions such as Tyzor® 212 and Tyzor® 215. Preferred cross-linking agents are Tyzor® 212 and Tyzor® 215.

According to another embodiment the cross-linking is chemical cross-linking. The cross-linking agent may be selected from formaldehyde, difunctional aldehydes such as glutaraldehyde, dichloroacetic acid, polyepoxides, urea, sodium trimetaphosphate, sodium tripolyphosphate, epichlorophydrin, phosphoryl chloride, glyoxal (OCHCHO), and ammonium zirconium (IV) carbonate.

The MFC may have an average diameter in the range 5-100 nm, for example in the range 5-70 nm, or in the range 10-50 nm. It may also have a length in the range 1-100 µm, for example 1-70 µm, or in the range 1-50 µm.

The invention also extends to an oil-well fluid comprising a dispersion including a viscosifier as set out above.

The advantages of using such a viscosifier in an oil well fluid will become clear from the examples that follow, but they include (i) using a smaller amount of polymer (fiber) in oil well fluids such as fracturing fluids; (ii) minimizing the formation damage due to the low amount of fiber used; (iii) simplifying and reducing the cost of the cleanup operation by using less chemicals; and (iv) improving the stability of the MFC gel (three dimensional network) toward the heat and contamination environment to which they are exposed which helps to guarantee a successful job performance.

The MFC is optionally in the form of an aqueous dispersion and the MFC may be present in an amount 1-50 g/l, or in an amount of 1-30 g/l, or in an amount 5-15 g/l. The MFC can also be in form of a non-aqueous fluid such as petroleum distillate or any types of glycols such as ethylene glycol. The concentration of MFC in such non-aqueous fluid can be in an amount of 1-800 g/l or in an amount of 100-600 g/l, or in an amount of 300-500 g/l.

In an embodiment the oil-well fluid additionally comprises a proppant and the concentration of the cross-linked MFC in the fluid is from 0.1-2.5 wt %. The proppant may be any suitable proppant, for example sand or a ceramic material.

The invention will be described below with reference to the accompanying figures in which.

Figure 1:
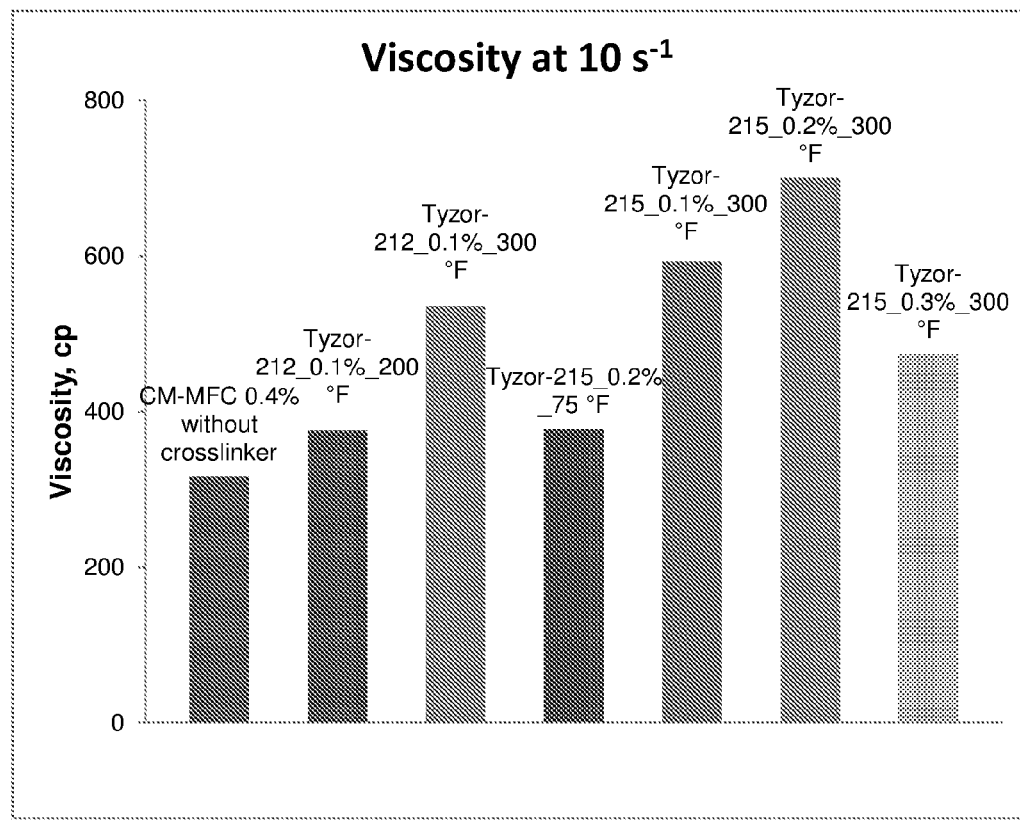
FIG. 1 shows the viscosity of CM-MFC fiber solution at a shear rate of $10 \ s^{-1}$ with different types and concentrations of Tyzor® crosslinker (see example 1.1)

The MFC materials used in the examples below were produced in the laboratory as described in the literature as follows.

TEMPO mediated MFC (TEMPO-MFC) was produced according to the publication of Saito et al. (Saito, T. Nishiyama, Y. Putaux, J. L. Vignon M. and Isogai. A. (2006). Biomacromolecules, 7(6): 1687-1691).

Enzymatic assisted MFC (EN-MFC) was produced according to the publication of Henriksson et al, European polymer journal (2007), 43: 3434-3441 (An environmentally friendly method for enzyme-assisted preparation of microfibrillated cellulose (MFC) nanofibers) and M. Pääkkö et al. Biomacromolecules, 2007, 8 (6), pp 1934-1941, Enzymatic Hydrolysis Combined with Mechanical Shearing and High-Pressure Homogenization for Nanoscale Cellulose Fibrils and Strong Gels.

Mechanically produced MFC (ME-MFC) was produced as described by Turbak A, et al. (1983) "Microfibrillated cellulose: a new cellulose product: properties, uses, and commercial potential". J Appl Polym Sci Appl Polym Symp 37:815-827. ME-MFC can also be produced by one of the following methods: homogenization, microfluidization, microgrinding, and cryocrushing. Further information about these methods can be found in paper of Spence et al. in Cellulose (2011) 18:1097-1111, "A comparative study of energy consumption and physical properties of microfibrillated cellulose produced by different processing methods".

Carboxymethylated MFC (CM-MFC) was produced according to the method set out in "The build-up of polyelectrolyte multilayers of microfibrillated cellulose and cationic polyelectrolytes" Wåagberg L, Decher G, Norgen M, Lindström T, Ankerfors M, Axnäs K Langmuir (2008) 24(3), 784-795.

The rheological properties of the various fibrillated cellulose with crosslinking agents were investigated in the laboratory in fresh water, sea water, and in brine solutions at different pH level, and at different temperatures from room temperature up to 175° C.

The equipment used to measure the various properties included a mass balance, a constant speed mixer up to 12000 rpm, a pH meter, a Fann 35 rheometer, a Physica Rheometer MCR—Anton Paar with Couette geometry CC27, and a heat aging oven (up to 260° C. at pressure of 100-1000 psi).

As mentioned above microfibrillated cellulose can be produced with one of the following methods and the resulting MFC can have slightly different properties.

Mechanically produced MFC: just mechanical shearing is used for the defibrillation. The surface charge of the fibril is quite small and similar to the original fiber.

Chemically assisted process; chemicals such as TEMPO are used to lower the energy consumption and make the defibrillation easier when compared to the pure mechanical method. Such chemical treatments introduce a negative charge on the surface of the fibril which in turn might affect the crosslinking reaction.

Enzymatic assisted process; enzymes such as cellulase are used to shorten the length of the fiber and make it easier to defibrillate. The surface charge is similar to the original fiber but might change slightly.

A combination of some or all of the above methods is also possible and may be beneficial in certain circumstances. Also crosslinked MFC can be used in viscosifying oil well fluids solely or combined with any commercially available viscosifiers such as guar gum, modified guar gum, starch and starch derivatives, cellulose and cellulose derivatives, xanthen gum, synthetic copolymers such as polyacrylamide and its derivatives, acrylates and its derivatives, viscoelastic surfactant or any clay minerals such as bentonite, sepiolite or attapulgite.

The concentration of a well-defibrillated MFC aqueous dispersion is normally below 50 g/l due to the high viscosity of the dispersion. In the examples below dispersions with concentrations of 10-30 g/l were diluted with distilled water and mixed in a Warring blender before adding the crosslinking agent. The pH of the dispersion was adjusted sometime before or after the addition of the crosslinking agent. The viscosity of the dispersion with and without crosslinker was measured at room and elevated temperatures. In some examples a salt such as potassium chloride (KCl) was added to the dispersions since it can be a main component in the fracturing fluid to minimize the shale hydration.

EXAMPLE 1

Tyzor® Products as a Crosslinker

Organometallic zirconium-complexes such as Tyzor® products have been used in fracturing fluid to crosslink guar gum. The crosslinking reaction depends on many parameters such as the type and the concentration of the polymer, the type and the concentration of the crosslinking agent, particularly the ligands attached to the metal ion, temperature, pH and the ionic strength. Also the ratio of ligands to metal was observed to have a significant impact on the crosslinker efficacy. The following examples illustrate the use of Tyzor® 212 and Tyzor® 215 to crosslink various types of MFC.

EXAMPLE 1.1

Crosslinking Reactions of CM-MFC with Tyzor-212® and Tyzor-215®

To a 100 ml solution of CM-MFC with the concentration of 0.4 wt % the following amounts of Tyzor®212 and 215 are added.

Test 1: Tyzor-212 (0.1%) at 93.3° C. (200° F.), pH=8.75
Test 2: Tyzor-212 (0.1%) at 149° C. (300° F.), pH=8.75
Test 3: Tyzor-215 (0.2%) at 23.9° C. (75° F.), pH=9.07
Test 4: Tyzor-215 (0.1%) at 149° C. (300° F.), pH=8.82
Test 5: Tyzor-215 (0.2%) at 149° C. (300° F.), pH=9.07
Test 6: Tyzor-215 (0.3%) at 149° C. (300° F.), pH=9.26

Sample preparation: A solution of CM-MFC with a concentration of 0.4 wt % was prepared. The crosslinking agent, Tyzor-212 (0.1 ml) or Tyzor-215 (0.1 ml, 0.2 ml or 0.3 ml) was then added to 100 ml CM-MFC solution. The pH was in the range of 8.75 to 9.30. The mixture was mixed in Waning blender for 2 min at speed of 2000 rpm.

The mixture was loaded into HPHT heat aging cell, and heated to 93.3° C. (200° F.) or 149° C. (300° F.). After 3 hours, the sample was cooled down, and the viscosity vs. shear rate was recorded at room temperature.

Figure 2:
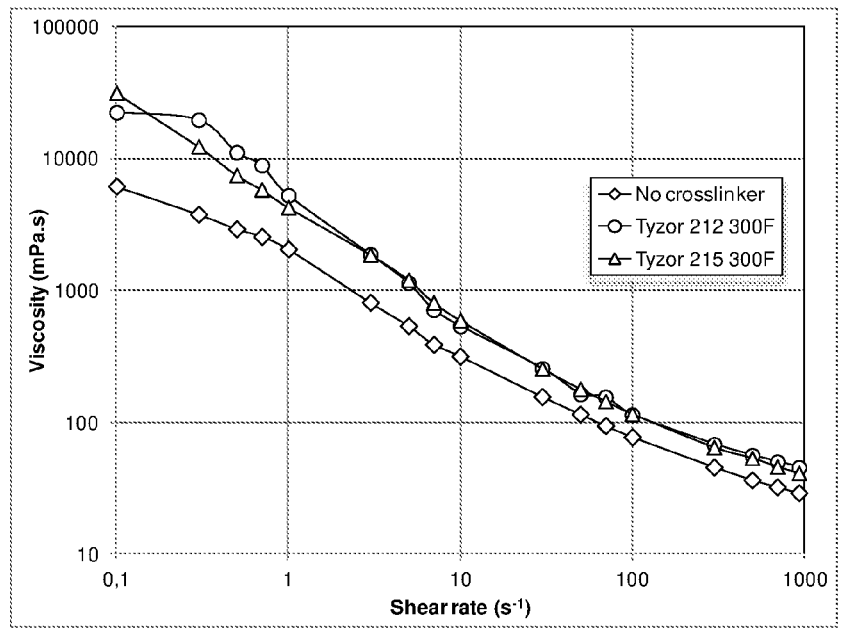
FIG. 2 shows the shear viscosity of CM-MFC fiber solution as function of shear rate (see example 1.1)

The increase of the viscosity of the fiber fluid with the addition of Tyzor-212 or Tyzor 215 at elevated temperatures as shown in FIGS. 1 and 2 indicates a crosslinking reaction took place at elevated temperature. Such enhancement of viscosity was more significant at 149° C. (300° F.) than 93.3° C. (200° F.).

FIG. 1 shows the viscosity of CM-MFC fiber solution at a shear rate of 10 s$^{-1}$ with different types and concentrations of Tyzor® crosslinker and at different aging temperatures. Referring to FIG. 2, the shear viscosity of CM-MFC fiber solution as function of shear rate is shown. The open diamond is the CM-MFC solution without any heat aging, the open circle is the data for test 2 after heat aging and open triangle is the data for test 4 after heat aging.

EXAMPLE 1.2

Crosslinking Reactions of ME-MFC with Tyzor-212® and Tyzor-215®

Figure 3:
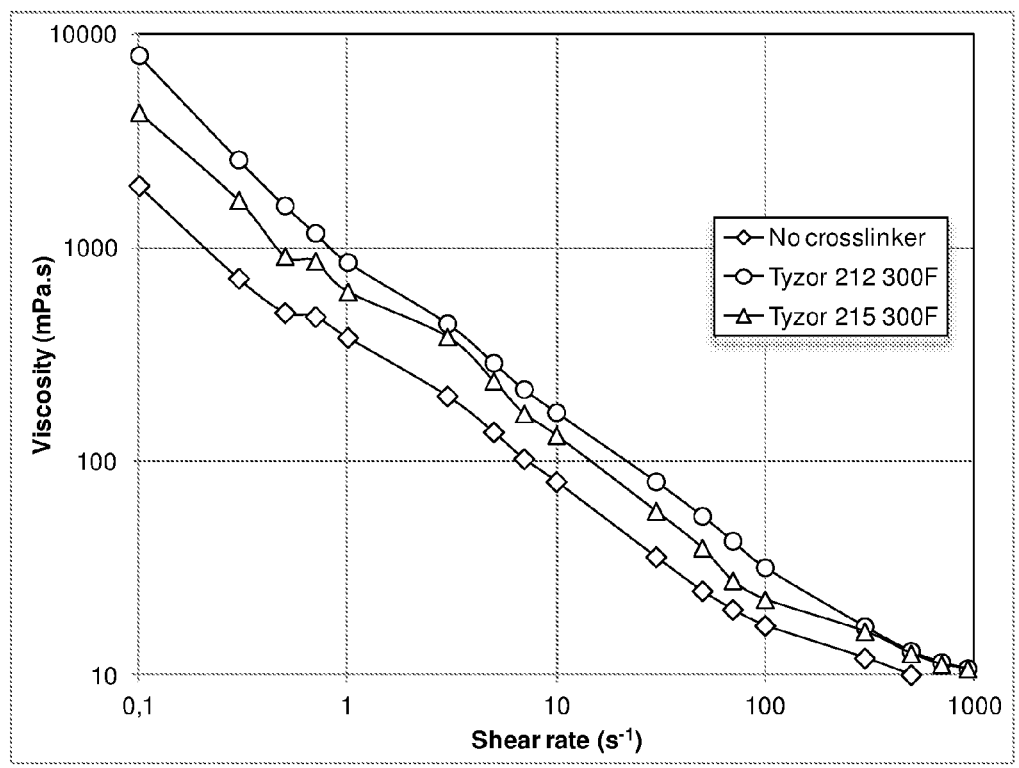
FIG. 3 shows the shear viscosity of ME-MFC fiber solution as function of shear rate (see example 1.2)
Figure 4:
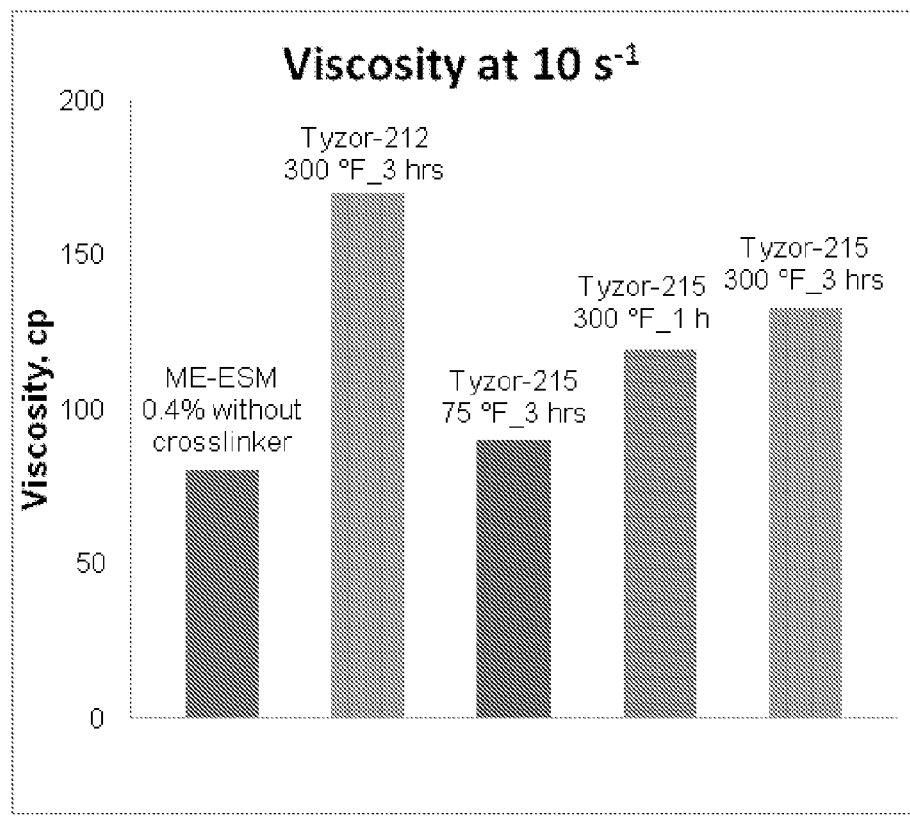
FIG. 4 shows the viscosity of ME-MFC fiber solution at a shear rate of $10 \ s^{-1}$ with different types and concentrations of Tyzor® crosslinker (see example 1.2)

A substantially similar effect of crosslinking was observed with ME-MFC as shown in FIGS. 3 and 4 as was obtained with CM-MFC with Tyzor-212® and Tyzor-215® as shown in FIGS. 1 and 2. The viscosity at a low shear rate range was doubled with the crosslink compare to the viscosity of the fiber solution without crosslinking agent. At similar concentration of fiber and crosslinking agent the viscosity of CM-MFC is significantly higher compare to the viscosity of ME-MFC.

A solution of ME-MFC with a concentration of 0.4 wt % was used in the following tests
Test 7: Tyzor-212 (0.2%) at 149° C. (300° F.), heat aged for 3 hours
Test 8: Tyzor-215 (0.2%) at 25° C. (77° F.), heat aged for 3 hours
Test 9: Tyzor-215 (0.2%) at 149° C. (300° F.), heat aged for 1 hour
Test 10: Tyzor-215 (0.2%) at 149° C. (300° F.), heat aged for 3 hours The pH for test 7-10 was adjusted between 9.4 and 9.6.

Referring to FIG. 3, the shear viscosity of ME-MFC fiber solution as function of shear rate is shown. The open diamond is the ME-MFC solution without any heat aging, the open circle is the data for test 7 after heat aging and open triangle is the data for test 10 after heat aging. FIG. 4 shows the viscosity of ME-MFC fiber solution at a shear rate of 10 s$^{-1}$ with different types and concentrations of Tyzor® crosslinker.

EXAMPLE 2

Crosslinking Reactions of Different Forms of MFC with Tyzor-212® and Tyzor-215® in Presence of KCl Salt This example shows the effect of KCl salt as an additive used in fracturing fluid. Before crosslinking it was observed that the addition of KCl salt reduces the viscosity of most of the cellulose fibers. This can be related to adsorption of the K ions on the negative sites on the surface of the fiber and slightly disrupting the fibers interaction. This was proved by the zeta potential measurement in the presence and absence of KCl where the zeta potential was dimensioned in presence of KCl. The effect of KCl in reducing the viscosity was much less for the non-charged MFC such as EN- and ME-MFC compared to the charged MFC such as CM- and TEMPO-MFC.

Table 1, below, shows the composition of MFC dispersions containing 2 wt % KCl salt and 0.2 wt % Tyzor 212® as a crosslinking agent.

TABLE 1

| Material | Fiber g | KCl g | Tyzor 212 g | Distilled water g | Mixing in warring blender speed 2000 rpm |
| --- | --- | --- | --- | --- | --- |
| ME-MFC | 1.6 | 8 | 0.8 | 400 | 3 min |
| EN-MFC | 1.6 | 8 | 0.8 | 400 | 3 min |

TABLE 1-continued

| Material | Fiber g | KCl g | Tyzor 212 g | Distilled water g | Mixing in warring blender speed 2000 rpm |
| --- | --- | --- | --- | --- | --- |
| CM-MFC | 1.6 | 8 | 0.8 | 400 | 3 min |
| TEMPO-MFC | 1.6 | 8 | 0.8 | 400 | 3 min |

Table 2, below, lists the viscosity measurements of MFC dispersions before (BHA) and after (AHA) heat aging. The heat aging was for 3 hours at 150° C.

Crosslinking of various types of MFC was also tested in sea water and a similar trend was observed as non-modified MFC showed significant increase in viscosity after heat aging whereas for modified MFC the increase was insignificant. The increase in viscosity for non-modified MFC indicates that the crosslinking reaction took place in sea water.

TABLE 2

| | | | Shear viscosity in mPa · s | |
| --- | --- | --- | --- | --- |
| Material | Temperature ° C. | pH | shear rate of 20 s$^{-1}$ | shear rate of 100 s$^{-1}$ |
| ME-MFC | BHA | 8.9 | 162 | 60 |
| | AHA at 150° C. | 8.9 | 300 | 98 |
| EN-MFC | BHA | 9.2 | 62 | 23 |
| | AHA at 150° C. | 8.8 | 106 | 36 |
| CM-MFC | BHA | 9.2 | 9 | 5 |
| | AHA at 150° C. | 9.3 | 62 | 22 |
| TEMPO-MFC | BHA | 8.9 | 80 | 26 |
| | AHA at 150° C. | 8.8 | 258 | 87 |

As shown in Table 2 the viscosity after heat aging was increased to a value which is double the value before the heat aging or even more, indicating a crosslinking reaction.

EXAMPLE 3

Dynamic Rheology

Most MFC type materials exhibit some viscoelastic properties even at a very low concentration of 0.1 wt %. This is related to the fiber entanglement, hydrogen bonding and other electrostatic interactions. The use of crosslinkers in many cases leads to an enhancement of the strength of the internal structural network. Dynamic or oscillatory rheology is a known method to study the viscoelastic properties of materials in suspension, emulsion, solution or gel forms.

As demonstrated in this example, both the moduli G' and G" were increased after crosslinking of ME-MFC using Tyzor 212® at 150° C. In a dynamic viscosity measurement the elastic (storage) modulus (G') is the ability of the material to store energy and the viscous (loss) modulus (G") is the ability of material to dissipate energy. It is clear to see in the FIG. 5 that the linear viscoelastic region (LVR) of the crosslinked material is longer than the one without crosslinking which means that with crosslinking the network is stronger than without crosslinking. Also the magnitude of the G' and the yield point for the crosslinked MFC dispersion is larger than the G' of the non-crosslinked MFC.

Figure 5:
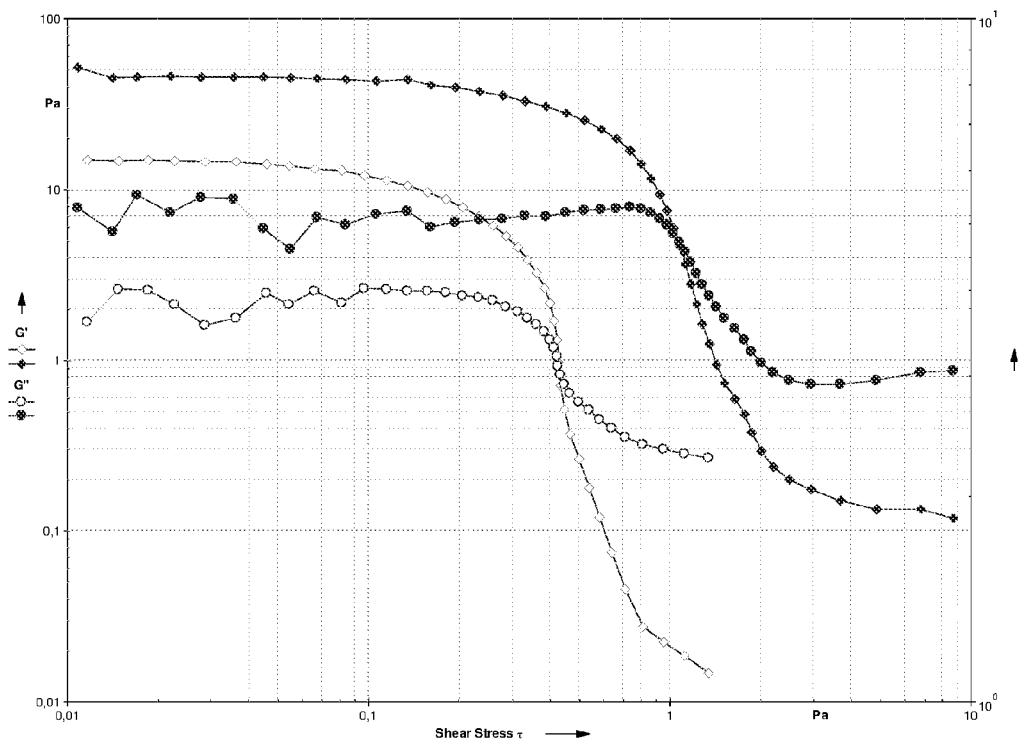
FIG. 5 shows the dynamic rheology of ME-MFC with Tyzor 212® before and after heat aging for 3 h at 150° C. (see example 3)

Referring to FIG. 5, this shows the dynamic rheology of ME-MFC with Tyzor 212® before and after heat aging for 3 h at 150° C. Rheology was measured at 20° C. and the pH was 8.9. The line shown by the empty circle (◯) represents G" before heat aging and the line shown by the empty diamond (◇) is for G' before heat aging. The line shown by the solid circle (●) is for G" after heat aging and the line shown by the solid diamond (♦) is for G' after heat aging.

Figure 6:
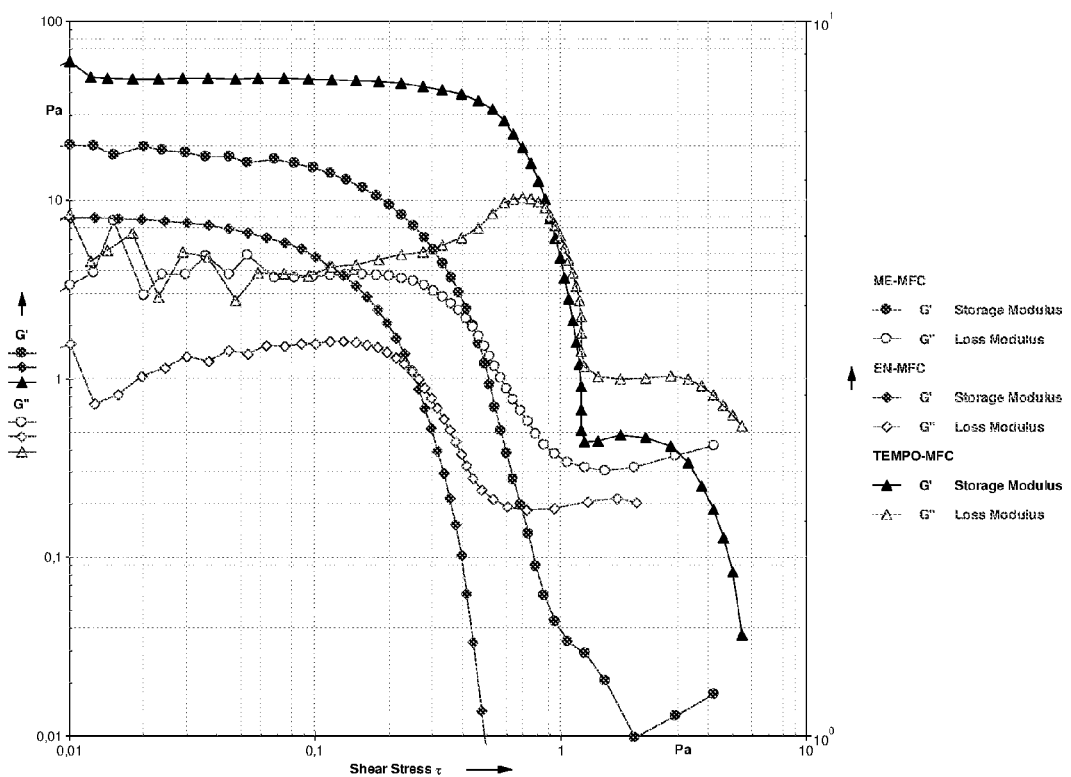
FIG. 6 shows the dynamic rheology of MFC measured at 20° C. and a pH of 9 for three different fibers at the same conditions of pH, temperature and ionic concentration (see example 3)

Referring now to FIG. 6, this shows the dynamic rheology of MFC measured at 20° C. and a pH of 9 for three different fibers at the same conditions of pH, temperature and ionic concentration. In this case, the line shown by the empty circle (○) represents G" and solid circle (●) is for G' for ME-MFC. The line shown by the empty diamond (◇) is for G" and solid diamond (♦) is for G' for EN-MFC. The line shown by the empty triangle (△) is for G" and solid triangle (▲) is for G' for TEMPO-MFC.

The curve in FIG. 6 shows that the internal network of the different fibers at similar solid concentration exhibit different rheological properties such as the storage modulus (G') and the yield point.

EXAMPLE 4

Use of 4,4'-biphenyldiboronic Acid ((BPDA) from Sigma-Aldrich as Crosslinking Agent

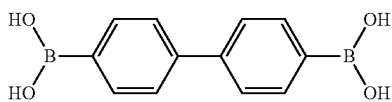 [SMILES: OB(O)c1ccc(-c2ccc(B(O)O)cc2)cc1]

BPDA as shown in structure above is diboroic acid and can be used as a crosslinker. The advantage of this molecule compared to boric acid is its large volume size which makes it possible to crosslink dilute polymer solution.

Solution 1 comprises 1.6 g TEMPO-MFC+66 g water+0.92 g KCl.

Solution 2 comprises 1.6 g TEMPO-MFC+66 g water+0.92 g KCl+0.05 g BPDA.

The viscosity of both of the solutions is measured at 40° C. and at pH 9.7.

Figure 7:
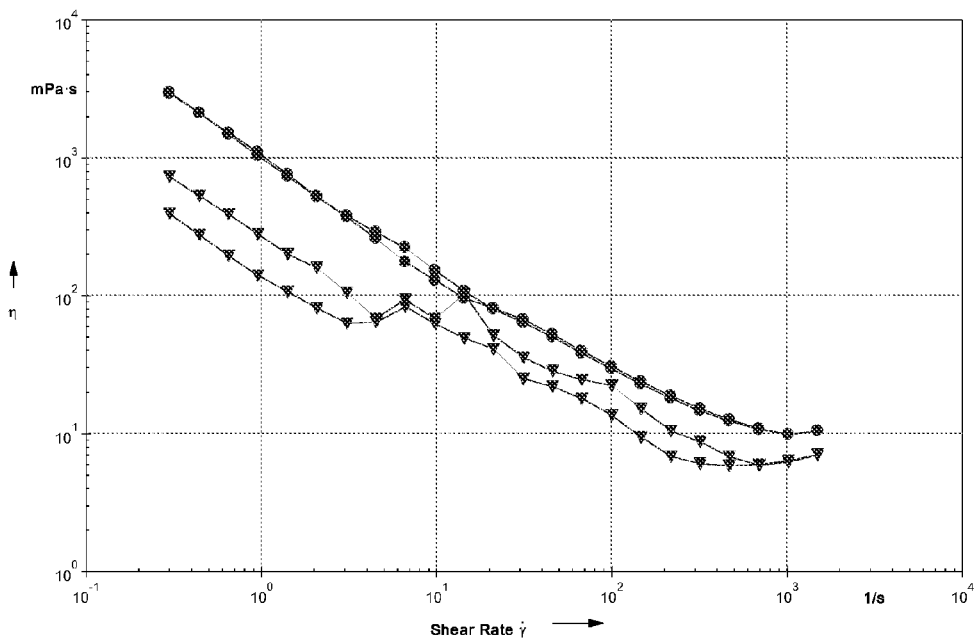
FIG. 7 shows the shear viscosity of TEMPO-MFC aqueous solution as function of shear rate with and without BPDA (see example 4)

BPDA was used to crosslink the TEMPO-MFC in Solution 2. Referring to FIG. 7, the solid triangle curve is the solution 1 and the solid circle curve is solution 2. As can be seen in the figure, the viscosity of TEMPO-MFC at a shear rate of 1 s$^{-1}$ was increased from 205 mPa·s to 1095 mPa·s going from solution 1 to solution 2. Such an increase in viscosity of 500% is a clear evidence for the crosslinking reaction. At the high shear region around a shear rate of 100-1000s$^{-1}$ the increase in viscosity was around 30%.

EXAMPLE 5

Chemical Crosslinking with Glutaraldehyde

In this example glutaraldehyde is used to demonstrate the chemical crosslinkability of different types of MFC material that can be used in some oil field applications such as enhanced oil recovery (EOR) or water shut-off. The pH was adjusted to 4.5 using HCl solution. After mixing glutaraldehyde with the chosen MFC solution and adjusting the pH the fluid was subjected to heat for 1 hour at 150° C. The fluid was then cooled down to room temperature and slightly homogenized and loaded into the rheometer for viscosity measurement. The different fluid compositions are given in Table 3 and the viscosity results are shown in Table 4. The big increase in viscosity was observed with TEMPO-MFC followed by ME-MFC. CM-MFC showed the least change and higher glutaraldehyde can be tried.

TABLE 3

| Material | Fiber g | glutaraldehyde solution (50%) g | Distilled water g | Mixing in warring blender speed 2000 rpm |
|---|---|---|---|---|
| ME-MFC | 0.8 | 0.5 | 200 | 3 min |
| CM-MFC | 0.8 | 0.5 | 200 | 3 min |
| TEMPO-MFC | 0.8 | 0.5 | 200 | 3 min |

TABLE 4

| | | | Shear viscosity in mPa · s | |
|---|---|---|---|---|
| Material | Temperature ° C. | pH | shear rate of 20 s$^{-1}$ | shear rate of 100 s$^{-1}$ |
| ME-MFC | BHA | 4.2 | 19 | 9 |
| | AHA at 150° C. | 4.0 | 62 | 21 |
| CM-MFC | BHA | 4.4 | 218 | 74 |
| | AHA at 150° C. | 4.4 | 183 | 64 |
| TEMPO-MFC | BHA | 4.6 | 173 | 72 |
| | AHA at 150° C. | 3.5 | 1126 | 132 |

Figure 8:
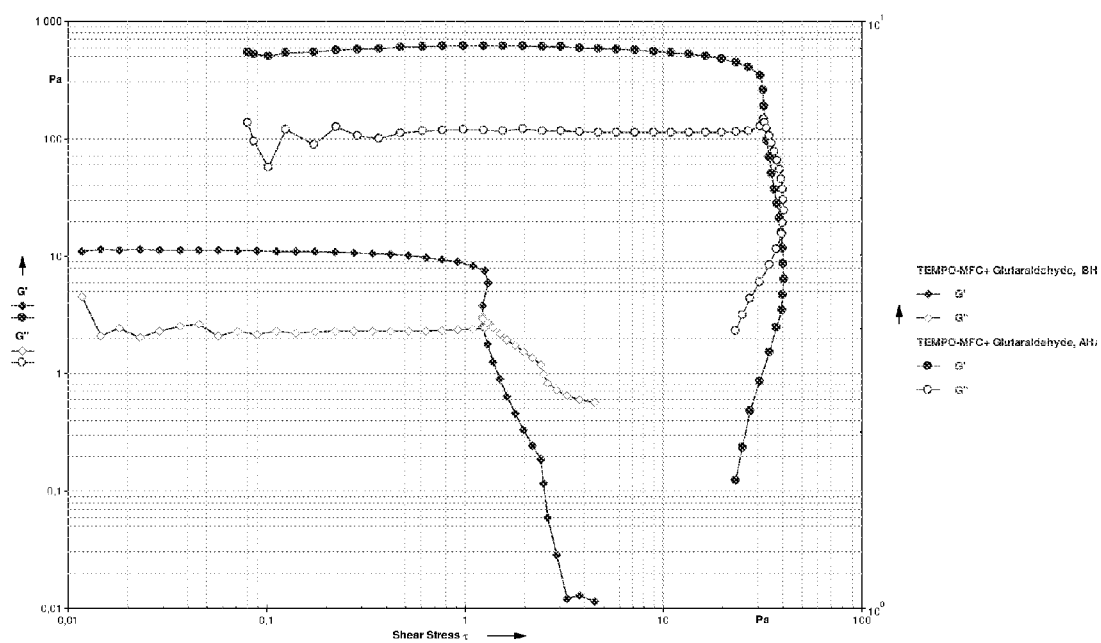
FIG. 8 shows the dynamic rheology of TEMPO-MFC measured at 20° C. (see example 5)

Referring to FIG. 8, this shows the dynamic rheology of TEMPO-MFC measured at 20° C. The line shown by the empty diamond (◇) is for G" and the solid diamond (♦) is for G' for TEMPO-MFC with glutaraldehyde before heat aging and the line shown by the empty circle (○) represent G" and the solid circle (●) is for G' for TEMPO-MFC with glutaraldehyde after heat aging. FIG. 8 shows a big increase in the storage modulus and shear stress at the network break down after crosslinking at high temperature. Such an increase indicates that the internal network is strengthened by the crosslinking and one expects that such hydrogel will be more thermally stable than non-crosslinked MFC.

EXAMPLE 6

Enzymatic Degradation

In certain applications, such as drilling or fracturing, the viscosifier should be removed after the treatment since such gellants tend to impair the productivity of oil or gas. The gellant is normally removed by chemical or physical means. Enzymatic degradation is a known technique to remove bio-degradable polymers such as starch, guar gum, and cellulose.

Simple tests were conducted on TEMPO-MFC and EN-MFC using Novozyme® 188 and Celluclast® 1.5 L from Novozyme North America, USA.

The shear rheology of MFC solutions treated with cellulase enzyme as a function of shear rate at different time interval were measured at 50° C.

EXAMPLE 6.1

TEMPO-MFC with Enzyme

The following mixture was formulated and heated at 50° C. overnight. Samples were taken at different intervals.

TEMPO-MFC (0.32 g MFC+80 g water+0.085 g Celluclast 1.5 L+0.085 g Novozyme 188 mix with magnetic stirrer for 5 min), pH was adjusted to 5 using 1M HCl Table 5 shows the viscosity of the TEMPO-MFC with enzyme as function of time

TABLE 5

| Time | Viscosity | | |
|---|---|---|---|
| (hour) | Shear rate 20 s$^{-1}$ | Shear rate 100 s$^{-1}$ | Oscillation |
| 0 | 267.1 | 182.4 | Structure |
| 1 | 83.4 | 38.8 | No structure |
| 3 | 43.5 | 17.5 | No structure |
| 6 | 31.4 | 13.5 | No structure |
| 26 | 17.4 | 8.7 | No structure |

Figure 9:
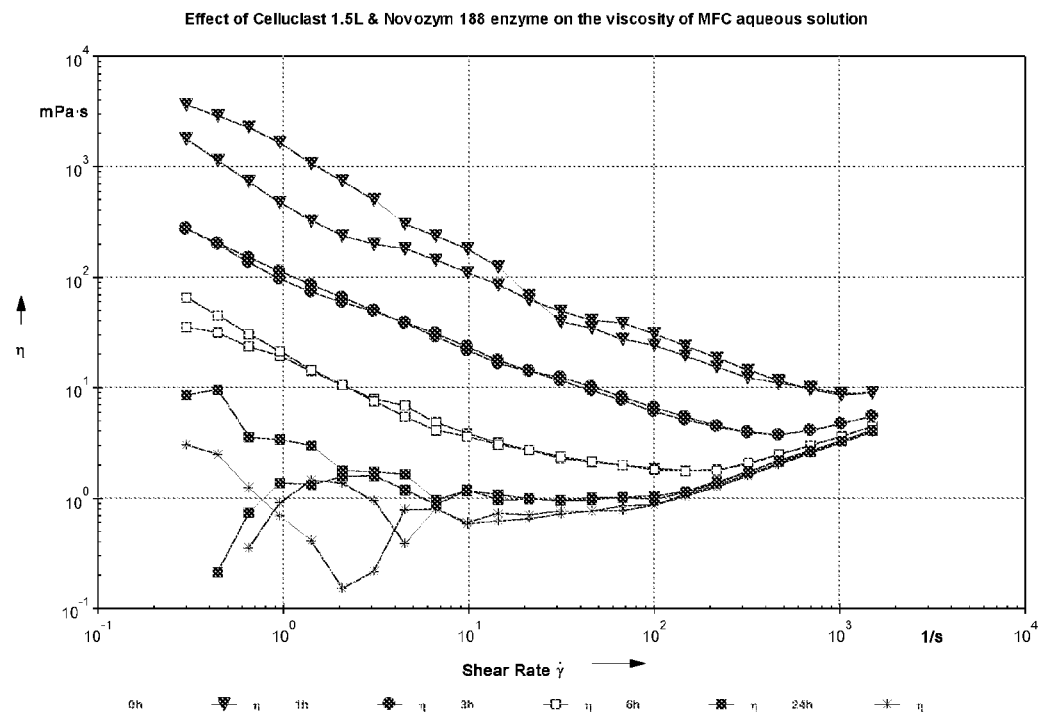
FIG. 9 shows the shear rheology of TEMPO-MFC solution treated with cellulose enzyme as function of shear rate at different time interval measured at 50° C. (see example 6.1)

FIG. 9 shows the shear rheology of TEMPO-MFC solution treated with cellulose enzyme as function of shear rate at different time interval measured at 50° C.

Figure 10:
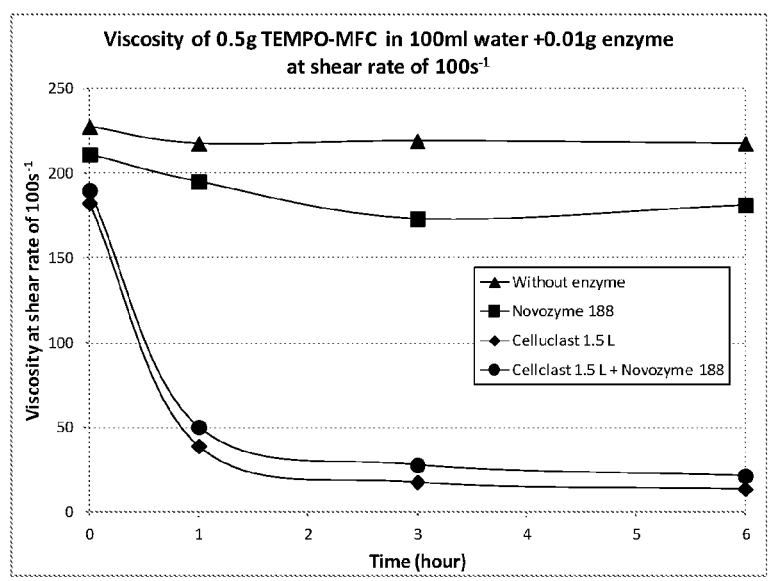
FIG. 10 shows the effect of adding an enzyme and/or a co-enzyme on the degradation of TEMPO-MFC (see example 6.1)

FIG. 10 shows the effect of adding an enzyme and/or a co-enzyme on the degradation of TEMPO-MFC. Looking at the lines at 3 hours, the top line is for TEMPO-MFC without any enzyme. The second line down is for TEMPO-MFC with Novozyme alone. The third line down is for TEMPO-MFC with Celluclast 1.5 L alone and the lowest line is for TEMPO-MFC with both Celluclast and Novozyme 188.

EXAMPLE 6.2

EN-MFC with Enzyme

Similar to the previous test the following mixture was prepared and tested.

EN-MFC (0.56 g MFC+80 g water+0.17 g Celluclast 1.5 L+0.17 g Novozyme 188 mix with magnetic stirrer for 5 min), pH was adjusted to 5 using 1N HCl.

Table 6 shows the viscosity of the EN-MFC with enzyme as function of time

TABLE 6

| Time | Viscosity | | |
|---|---|---|---|
| (hour) | Shear rate 20 s$^{-1}$ | Shear rate 100 s$^{-1}$ | Oscillation |
| 0 | 87.9 | 38.0 | Structure |
| 1 | 15.8 | 6.7 | Structure |
| 3 | 2.9 | 1.9 | No structure |
| 6 | 1.1 | 1.1 | No structure |
| 26 | 0.76 | 0.91 | No structure |

Figure 11:
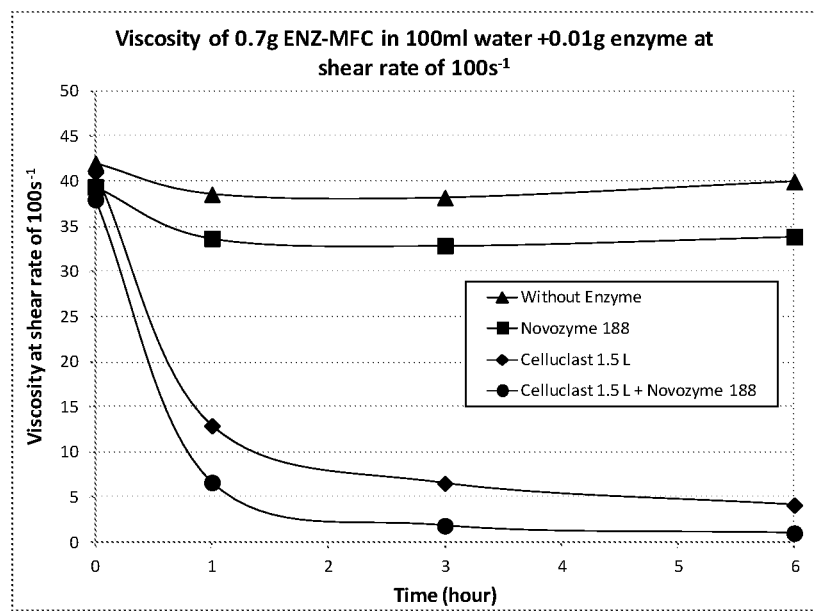
FIG. 11 shows the effect of enzyme and co-enzyme on the degradation of EN-MFC (see example 6.2).

FIG. 11 shows the effect of enzyme and co-enzyme on the degradation of EN-MFC. Looking at the lines at 3 hours, the top line is for EN-MRC without any enzyme. The second line down is for EN-MFC with Novozyme 188 alone. The third line down is for EN-MFC with Celluclast 1.5 L alone and the lowest line is for EN-MFC with both Celluclast 1.5 L and Novozyme 188.

Both Tables 5 and 6 and FIGS. 9 to 11 show that different forms of MFC can be easily removed by enzyme within a time of less than 3 hours. Also other chemical treatment such as acid hydrolysis or chlorate oxidation can be used.

The results from the various examples show that different forms of MFC which are crosslinked with a range of different materials exhibit good shear thinning properties. It forms a network structure that can suspend the solid particles such as drilling cuts or weighting agents in case of drilling fluid or proppant in case of fracturing. It also showed good thermal stability and high tolerance to the salt concentrations which may be encountered. The addition of crosslinking agent increased the viscosity and enhanced the strength of the structural network.

The examples show that MFC can be used as a viscosifier for drilling, stimulation and enhanced oil recovery applications particularly in a high temperature environment. A range of different MFC types can be physically and chemically crosslinked. The crosslinking enhances the viscosity of the MFC fluid which can be used in various oilfield applications such as stimulation (fracturing), drilling, water shut-off, and enhanced oil recovery (EOR). Such crosslinked MFC, either physical or chemical, can also be used to prevent or minimize the loss of drilling fluids or cementing slurry into weak formations that have a high permeability. Such application is known by the industry as loss circulation materials (LCM). LCM provides certain seal or plugging to such high permeability formations.

Optionally, physically crosslinked MFC with a Zr complex (such as a Tyzor® product, for example) can be used for stimulation and drilling. Alternatively, chemically crosslinked MFC can be used in water shut-off and EOR. The use of crosslinked MFC will reduce the overall cost, reduce the formation damage, and enhance the thermal stability of the product. It has also been shown that while KCl salt (which is often present) has a negative impact on the viscosity of some crosslinked and non-crosslinked MFC's it does not prevent the crosslinking and the crosslinked product still has a higher viscosity than the non-crosslinked MFC.

The invention claimed is:

1. A viscosifier for oil well fluids, said viscosifier comprising a cross-linked Micro Fibrillar Cellulose (MFC) microfibers or Micro Fibrillar Cellulose (MFC) nanofibers,
   wherein the MCF is selected from the group consisting of TEMPO mediated MFC, Enzymatic assisted MFC, mechanically produced MFC and Carboxymethylated MFC,
   wherein the cross-linking is a physical cross-linking formed by a metal cation or metal complex or cationic organic chemicals, and
   wherein guar gum and its chemically modified forms are excluded from the viscosifier.

2. The viscosifier as claimed in claim 1, wherein the MFC is cationic, anionic or non-ionic.

3. The viscosifier as claimed in claim 1, wherein the metal cation or metal complex is selected from the group consisting of aluminum sulfate ($Al_2(SO_4)_3$), aluminum chloride ($AlCl_3$), zirconium chloride ($ZrCl_4$), chitosan, hyberbranched polymers, polyethyleneimine (PEI), boric acid, borax and borate salts, boron minerals, organo-borate complexes, organometallic compounds containing Zr, Ti or Hf ions.

4. The viscosifier as claimed in claim 1, wherein the MFC has an average diameter in the range of 5-100 nm.

5. The viscosifier as claimed in claim 1, wherein the MFC is in form of an aqueous dispersion.

6. The viscosifier as claimed in claim 1, wherein the MFC is in form of a non-aqueous dispersion.

7. An oil-well fluid comprising a dispersion including a viscosifier as claimed in claim 1.

8. The oil-well fluid as claimed in claim 7, wherein the dispersion is an aqueous dispersion.

9. The oil-well fluid as claimed in claim 8, wherein the viscosifier is present in an amount 1-50 g/l, or in an amount of 1-30 g/l, or in an amount 5-15 g/l.

10. The oil-well fluid as claimed in claims 7, wherein the oil-well fluid additionally comprises a proppant and the concentration of the cross-linked MFC in the fluid is from 0.1-2.5 wt%.

11. The oil-well fluid as claimed in claim 10, wherein the proppant is sand or a ceramic material.

12. An oil-well cementing slurry comprising a dispersion including a viscosifier as claimed in claim 1.

13. The oil-well cementing slurry as claimed in claim 12, wherein the viscosifier is present in an amount 1-50 g/l, or in an amount of 1-30 g/l, or in an amount 5-15 g/l.

14. The viscosifier as claimed in claim 1, wherein the MFC has a length in the range of 1-100 μm.

15. The viscosifier as claimed in claim 3, wherein the boron minerals is Ulexite ($NaCaB_5O_6(OH)_6.5(H_2O)$) or Colemanite ($CaB_3O_4(OH)_3.H_2O$)).

16. The viscosifier as claimed in claim 3, wherein the organo-borate complexes is 4,4'-biphenyldiboronic acid.

17. The viscosifier as claimed in claim 3, wherein the hyberbranched polymer is a hyberbranched polyesteramide.

18. The viscosifier as claimed in claim 3, wherein the organometallic compounds containing Zr, Ti or Hf ions is a zirconium chelate with approximately 52% active ingredient in alcohol solution or a zirconium chelate with approximately 28% active ingredient in alcohol solution.

19. A viscosifier for oil well fluids, said viscosifier comprising a cross-linked Micro Fibrillar Cellulose (MFC) microfibers or Micro Fibrillar Cellulose (MFC) nanofibers,
wherein the MCF is selected from the group consisting of TEMPO mediated MFC, Enzymatic assisted MFC, mechanically produced MFC and Carboxymethylated MFC, and
wherein the cross-linking is a physical cross-linking formed by a metal cation or metal complex or cationic organic chemicals, or a chemical cross-linking.

20. The viscosifier as claimed in claim 19, wherein the cross-linking is chemical cross-linking.

21. The viscosifier as claimed in claim 20, wherein the cross-linking agent is selected from the group consisting of formaldehyde, difunctional aldehydes, dichloroacetic acid, polyepoxides, urea, sodium trimetaphosphate, sodium tripolyphosphate, epichlorophydrin, phosphoryl chloride, glyoxal (OCHCHO), and ammonium zirconium(IV) carbonate.

* * * * *